United States Patent
Hayase

(10) Patent No.: US 6,225,926 B1
(45) Date of Patent: May 1, 2001

(54) INTERMITTENT DIGITAL DEMODULATION APPARATUS HAVING REDUCED WAITING TIME PERIOD

(75) Inventor: Ayumi Hayase, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/329,254

(22) Filed: Jun. 10, 1999

(30) Foreign Application Priority Data

Jun. 12, 1998 (JP) .................................................. 10-165416

(51) Int. Cl.[7] .............................. H03M 1/00; H03M 9/00
(52) U.S. Cl. .......................... 341/110; 341/100; 341/101
(58) Field of Search ................................. 341/100, 101, 341/110; 375/330

(56) References Cited

U.S. PATENT DOCUMENTS 5,588,027 * 12/1996 Lim ....................................... 375/330
5,987,074 * 11/1999 Wakamatsu .......................... 375/332

FOREIGN PATENT DOCUMENTS 5-48591 2/1993 (JP) .
5-183432 7/1993 (JP) .
6-338784 12/1994 (JP) .

\* cited by examiner

Primary Examiner—Michael Tokar
Assistant Examiner—Joseph Lauture
(74) Attorney, Agent, or Firm—McGuire Woods LLP

(57) ABSTRACT

In a digital demodulation apparatus, a first signal generating circuit generates a first clock signal and a first frame signal which are always in an active state, and a second signal generating circuit generates a second clock signal and a second frame signal which are intermittently in an active state. An analog-to-digital converter converts an intermediate analog signal into a digital signal. A smoothing digital filter performs a smoothing operation upon the digital signal in synchronization with the first clock signal and the first frame signal to general parallel data. A data phase synchronization circuit converts the parallel data into serial data in synchronization with the second clock signal and the second frame signal. A digital signal processing circuit performs a signal processing operation upon the serial data in synchronization with the second clock signal and the second frame signal.

9 Claims, 10 Drawing Sheets

INTERMITTENT DIGITAL DEMODULATION APPARATUS HAVING REDUCED WAITING TIME PERIOD

BACKGROUND OF THE INVENTION

1. Field of the Invention

The present invention relates to a digital demodulation apparatus used in a mobile station powered by a battery.

2. Description of the Related Art

A mobile station based on standard IS-136 or GSM requires reduction of power dissipation, which increases the serviceability of a battery, i.e., the serviceability of the mobile station. For this purpose, a digital demodulation apparatus in the mobile station is intermittently operated.

In a prior art digital demodulation apparatus, a first signal generating circuit generates a first clock signal and a first frame signal which are always in an active state, and a second signal generating circuit generates a second clock signal and a second frame signal which are intermittently in an active state. An analog-to-digital (A/D) converter converts an intermediate analog signal into a digital signal. A smoothing digital filter performs a smoothing operation upon the digital signal in accordance with an internal frame signal to generate serial data. A digital signal processing circuit performs a signal processing operation upon the serial data in synchronization with the second clock signal and the second frame signal. This will be explained later in detail.

In the above-described prior art intermittent digital demodulation apparatus, however, since the smoothing digital filter stops its operation when the second signal generating circuit is switched from an active mode to an inactive mode, a large waiting time period is generated in the digital signal processing circuit after the second signal generating circuit is recovered from the inactive mode to an active mode. This increases the power dissipation, and as a result, the serviceability of the mobile station is decreased.

SUMMARY OF THE INVENTION

It is an object of the present invention to provide an intermittent digital demodulation apparatus capable of reducing the waiting time period.

According to the present invention, in a digital demodulation apparatus, a first signal generating circuit generates a first clock signal and a first frame signal which are always in an active state, and a second signal generating circuit generates a second clock signal and a second frame signal which are intermittently in an active state. An A/D converter converts an intermediate analog signal into a digital signal. A smoothing digital filter performs a smoothing operation upon the digital signal in synchronization with the first clock signal and the first frame signal to generate parallel data. A data phase synchronization circuit converts the parallel data into serial data in synchronization with the second clock signal and the second frame signal. A digital signal processing circuit performs a signal processing operation upon the serial data in synchronization with the second clock signal and the second frame signal.

Thus, the smoothing digital filter is always active, while the data phase synchronization circuit generates valid serial data intermittently. In this case, the time required for the phase conversion processing operation of the data phase synchronization circuit is much smaller than the time required for the operation of the smoothing digital filter the waiting time period in the digital signal processing circuit can be much smaller than that of the prior art.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENT

Before the description of the preferred embodiment, a prior art digital demodulation apparatus will be explained with reference to FIGS. 1 and 2.

Figure 1:
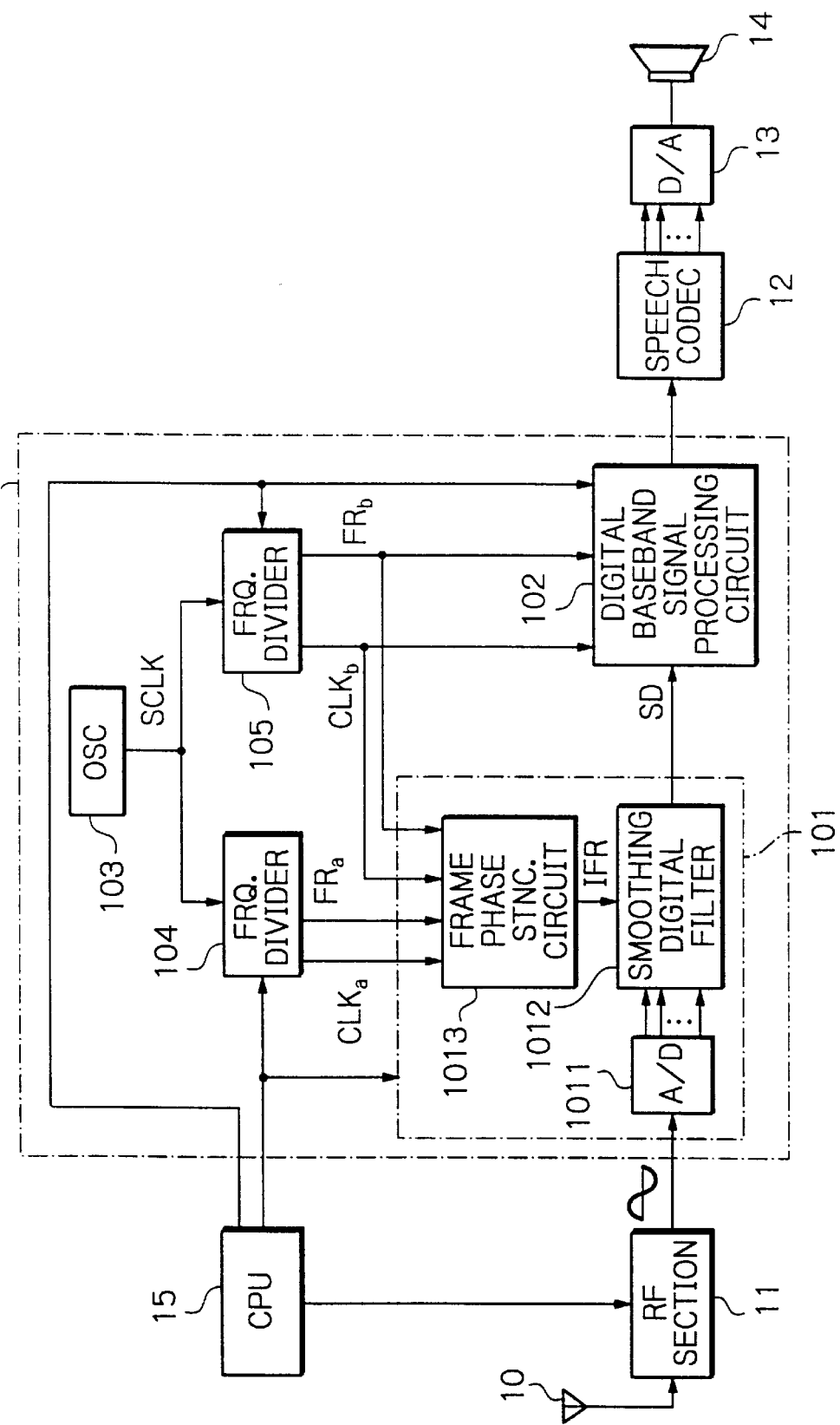
FIG. 1 is a block circuit diagram illustrating a prior art digital demodulation apparatus.

In FIG. 1, a prior art digital demodulation apparatus 100 is connected between a radio frequency section 11 and a speech codec 12 of a mobile station. In this case, the radio frequency section 11 is connected to an antenna 10, while the speech codec 12 is connected via a digital/analog converter 13 to a speaker 14. Also, a central processing unit is provided to control the entire mobile station.

The digital demodulation apparatus 100 is constructed by an intermediate frequency-to-baseband signal conversion circuit 101 and a digital baseband signal processing circuit 102.

The intermediate frequency-to-baseband signal conversion circuit 101 is driven by clock signals $CLK_a$ and $CLK_b$ and frame signals $FR_a$ and $FR_b$, while the digital baseband signal processing circuit 102 is driven by the clock signal $CLK_b$ and the frame signal $FR_b$. Thus, the intermediate frequency-to-baseband signal conversion circuit 101 and the digital baseband signal processing circuit 102 are operated in synchronization with each other.

The clock signals $CLK_a$ and $CLK_b$ and the frame signals $FR_a$ and $FR_b$ are generated by an oscillator 103 for generating a system clock signal SCLK, a frequency divider 104 for dividing the frequency of the system clock signal SCLK to generate the clock signal $CLK_a$ and the frame signal $FR_a$, and a frequency divider 105 for dividing the frequency of the system clock signal SCLK to generate the clock signal $CLK_b$ and the frame signal $FR_b$.

The CPU 15 operates the radio frequency section 11 intermittently, and resets the intermediate frequency-to-baseband signal conversion circuit 101 and frequency dividers 104 and 105.

The intermediate frequency-to-baseband signal conversion circuit 101 is constructed by an analog/digital (A/D) converter 1011, a smoothing digital filter 1012 and a frame phase synchronization circuit 1013. The A/D converter 1011 converts an intermediate frequency analog signal from the radio frequency section 11 into a digital signal. The smoothing digital filter 1012 is driven by an internal frame signal IFR from the frame phase synchronization circuit 1013 to perform a digital filtering operation upon the digital signal from the A/D converter 1011, thus generating serial data SD. The frame phase synchronization circuit 1013 rearranges the clock signal $CLK_a$ and the frame signal $FR_a$ by using the clock signal $CLK_b$ and the frame signal $FR_b$, respectively, to generate the internal frame signal IFR.

The digital baseband signal processing circuit 102 performs a wave-equalizing operation, an error checking and correcting operation, and a speech decoding operation upon the serial data SD from the intermediate frequency-to-baseband signal conversion circuit 101.

The operation of the digital demodulation apparatus 100 of FIG. 1 is explained next with reference to FIG. 2. In FIG. 2, the radio frequency section 11 is intermittently operated by the CPU 15 to decrease the power dissipation. That is, the radio frequency section 11 is operated only during a time period T. Also, the CPU 15 resets the frequency dividers 104 and 105 at every time period T. Also, the CPU 15 controls the frequency dividers 104 and 105, so that the frame signal $FR_a$ as well as the clock signal $CLK_a$ is always made active irrespective of the intermittent operation, while the frame signal $FR_b$ as well as the clock signal $CLK_b$ is made active only during a shifted time period T. When the frame signal $FR_b$ is active, the output signal of the frame phase synchronization circuit 1013 is normal. On the other hand, when the frame signal $FR_b$ is inactive, the output signal of the frame phase synchronization circuit 1013 is abnormal. Note that, if a frame signal is active, the frame signal is constructed by a plurality of high and low level signals and its clock signal is also constructed by a plurality of high and low level signals. On the other hand, if a frame signal is inactive, the frame signal and its clock signal are both at a low level.

Even when the output signal of the frame phase synchronization circuit 1013 is switched from abnormal to normal, the serial data SD of the smoothing digital filter 1012 continues invalid for a time period T1 after the smoothing digital filter 1012 begins to operate. The time period T1 is called a waiting time period which is also affected by the difference in phase between the frame signals $FR_a$ and $FR_b$. Therefore, the digital baseband signal processing circuit 102 is intermittently operated by the CPU 15 only during a time period T2.

In the digital demodulation apparatus 100 of FIG. 1, however, the waiting time period T1 is so large as to increase the power dissipation, which decreases the serviceability of the mobile station.

Figure 3:
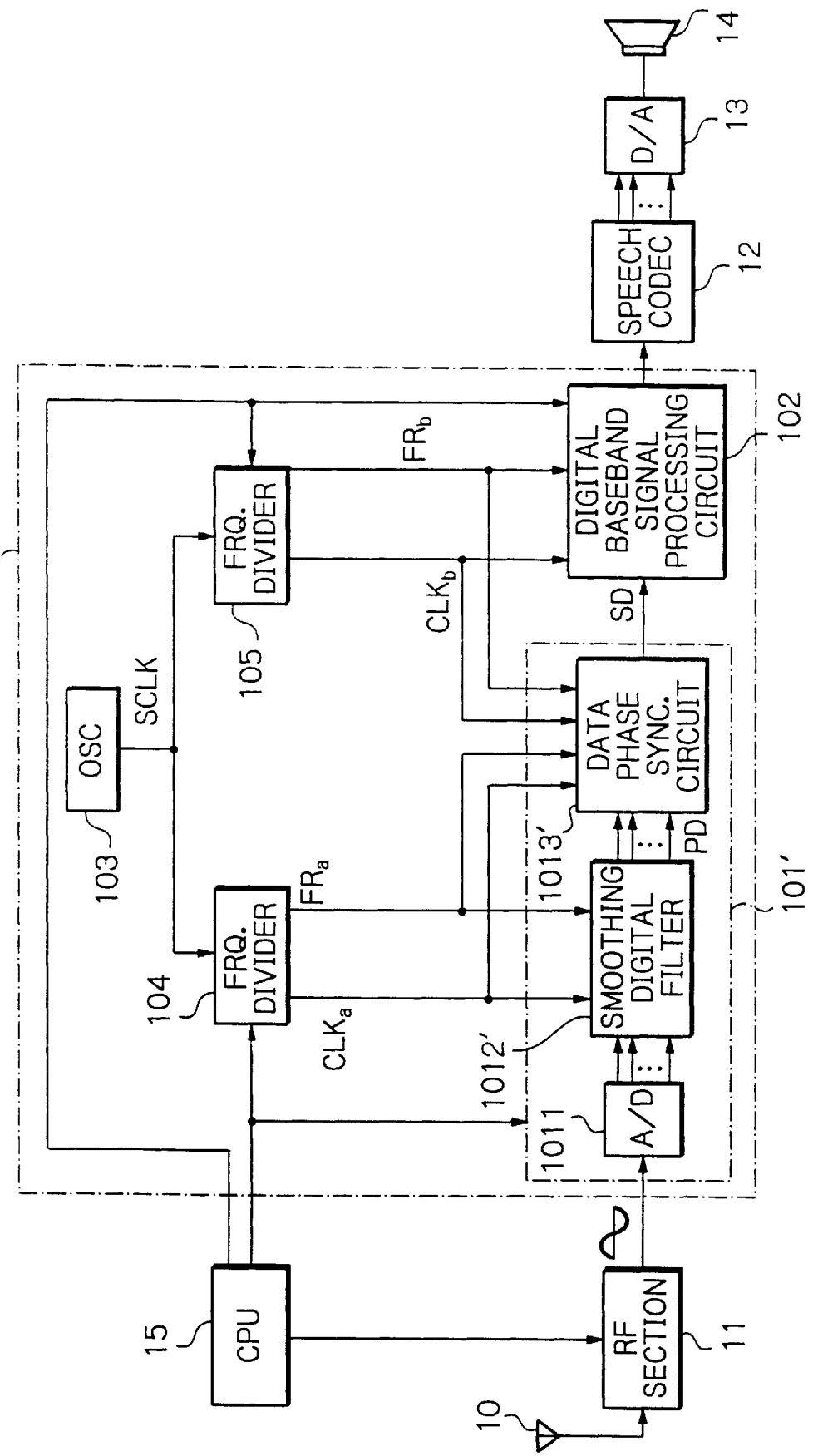
FIG. 3 is a block circuit diagram illustrating an embodiment of the digital demodulation apparatus according to the present invention.

In FIG. 3, which illustrates an embodiment of the digital demodulation apparatus according to the present invention, a digital demodulation apparatus 200 includes an intermediate frequency-to-baseband signal processing circuit 101' instead of the intermediate frequency-to-baseband signal processing circuit 101 of FIG. 1. Also, the intermediate frequency-to-baseband signal processing circuit 101' includes a smoothing digital filter 1012' and a data phase synchronization circuit 1013' instead of the smoothing digital filter 1012 and the frame phase synchronization circuit 1013, respectively, of FIG. 1.

The smoothing digital filter 1012' is of a finite length impulse response (FIR) type which receives the clock signal $CLK_a$ and the framl signal $FR_a$ to perform a smoothing operation and a bandwidth restricting operation upon the digital signal from the A/D converter 1011, thus generating parallel data PD. Also, the data phase synchronization circuit 1013' receives the clock signals $CLK_a$ and $CLK_b$ and the frame signals $FR_a$ and $FR_b$ to convert the parallel data PD into the serial data SD.

The operation of the digital demodulation apparatus 200 of FIG. 3 is explained with reference to FIG. 4.

Figure 4:
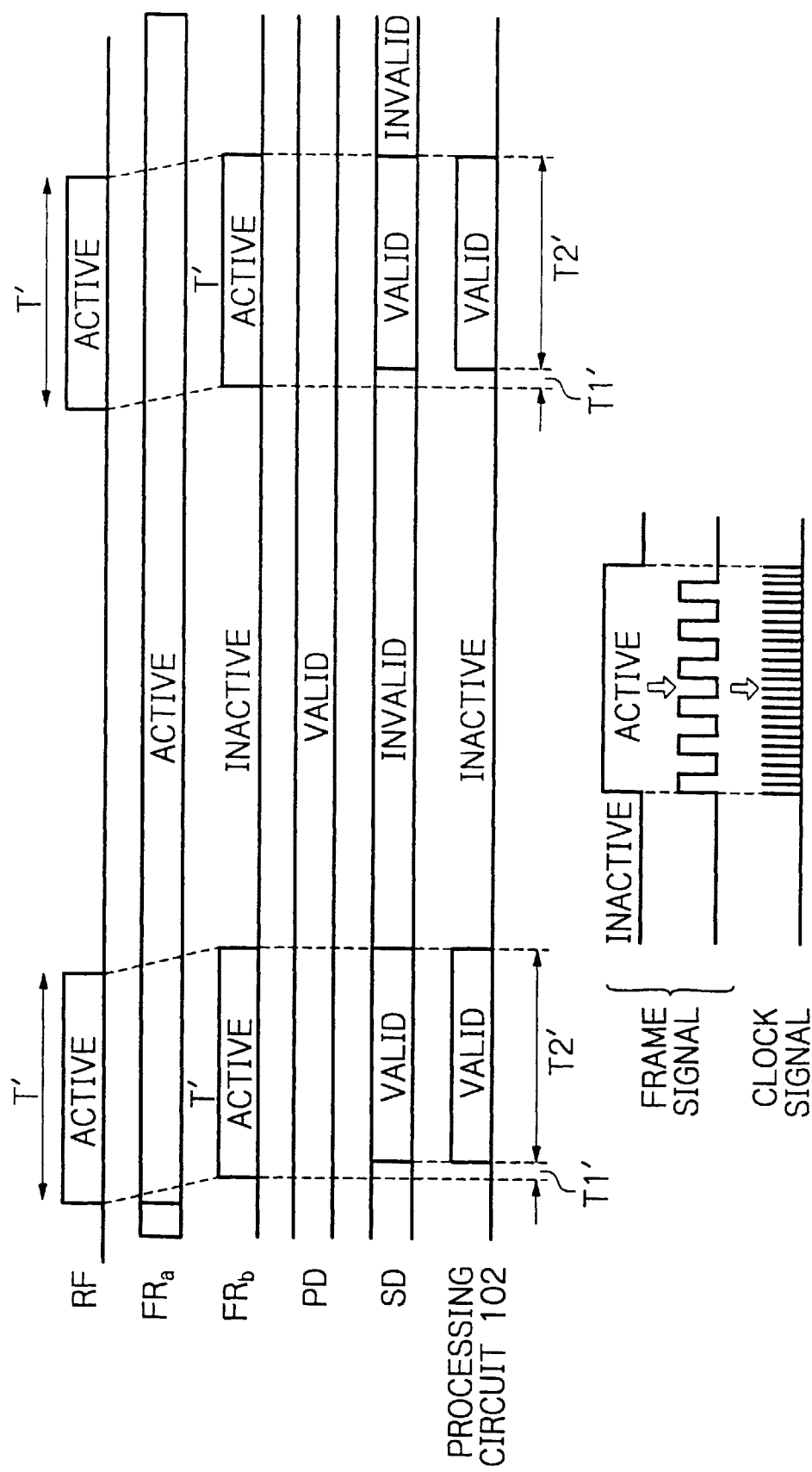
FIG. 4 is a timing diagram for explaining the operation of the apparatus of FIG. 3.

In FIG. 4, the radio frequency section 11 is intermittently operated by the CPU 15 to decrease the power dissipation. That is, the radio frequency section 11 is operated only during a time period T'. Also, the CPU 15 resets the frequency dividers 104 and 105 at every time period T'. Also, the CPU 15 controls the frequency dividers 104 and 105, so that the frame signal $FR_a$ and its clock signal $CLK_a$ is always made active irrespective of the intermittent operation, while the frame signal $FR_b$ as well as its clock signal $CLK_b$ is made active only during a shifted time period T'. Since the frame signal $FR_a$ is always active, the smoothing digital filter 1012' always generates valid parallel data PD. On the other hand, only when the frame signal $FR_b$ is active, is the serial data SD of the data phase synchronization circuit 1013' normal.

Even when the frame signal $FR_b$ is switched from inactive to active, the serial data SD of the data phase synchronization circuit 1013' continues invalid for a time period T1' after the data phase synchronization circuit 1013' begins to operate. The time period T1' is called a waiting time period which is also affected by the difference in phase between the operation of the radio frequency section 11 and the frame signal $FR_b$. Therefore, the digital baseband signal processing circuit 102 is intermittently operated by the CPU 15 only during a time period T2'.

Figure 2:
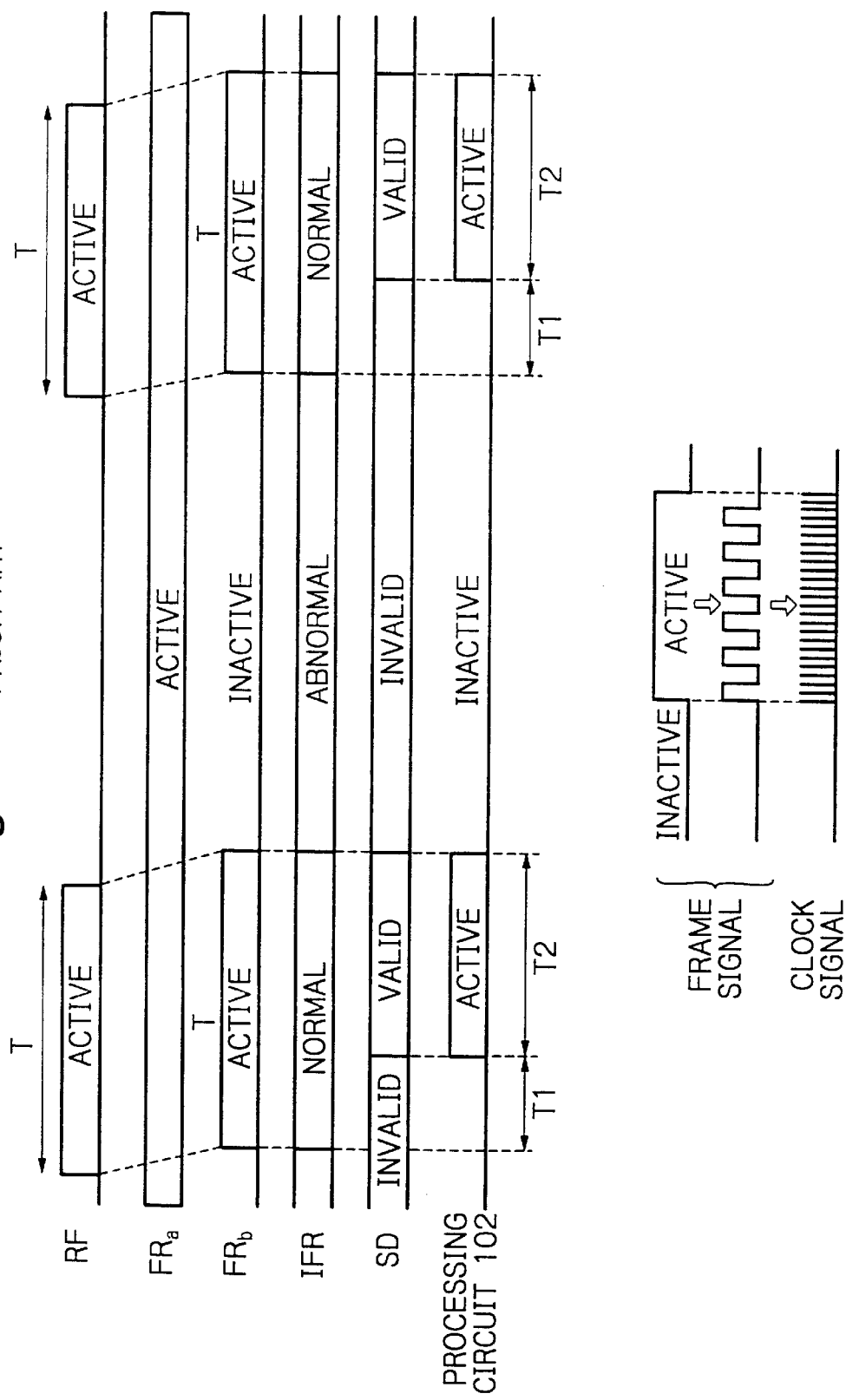
FIG. 2 is a timing diagram for explaining the operation of the apparatus of FIG. 1.

In the digital demodulation apparatus 200 of FIG. 3, since the time required for the phase conversion processing operation of the data phase synchronization circuit 1013' is much smaller than the time required for the operation of the smoothing digital filter 1012 of FIG. 1, the waiting time period T1' is much smaller than the waiting time T1 of FIG. 2. In FIG. 3, note that the smoothing digital filter 1012' always operates to generate the valid parallel data PD. Therefore, in the data phase synchronization circuit 1013', the serial data SD can be rapidly switched from invalid to valid simply by synchronizing the parallel data PD with the frame signal $FR_b$. Thus, the power dissipation can be decreased, which increases the serviceability of the mobile station.

Figure 5:
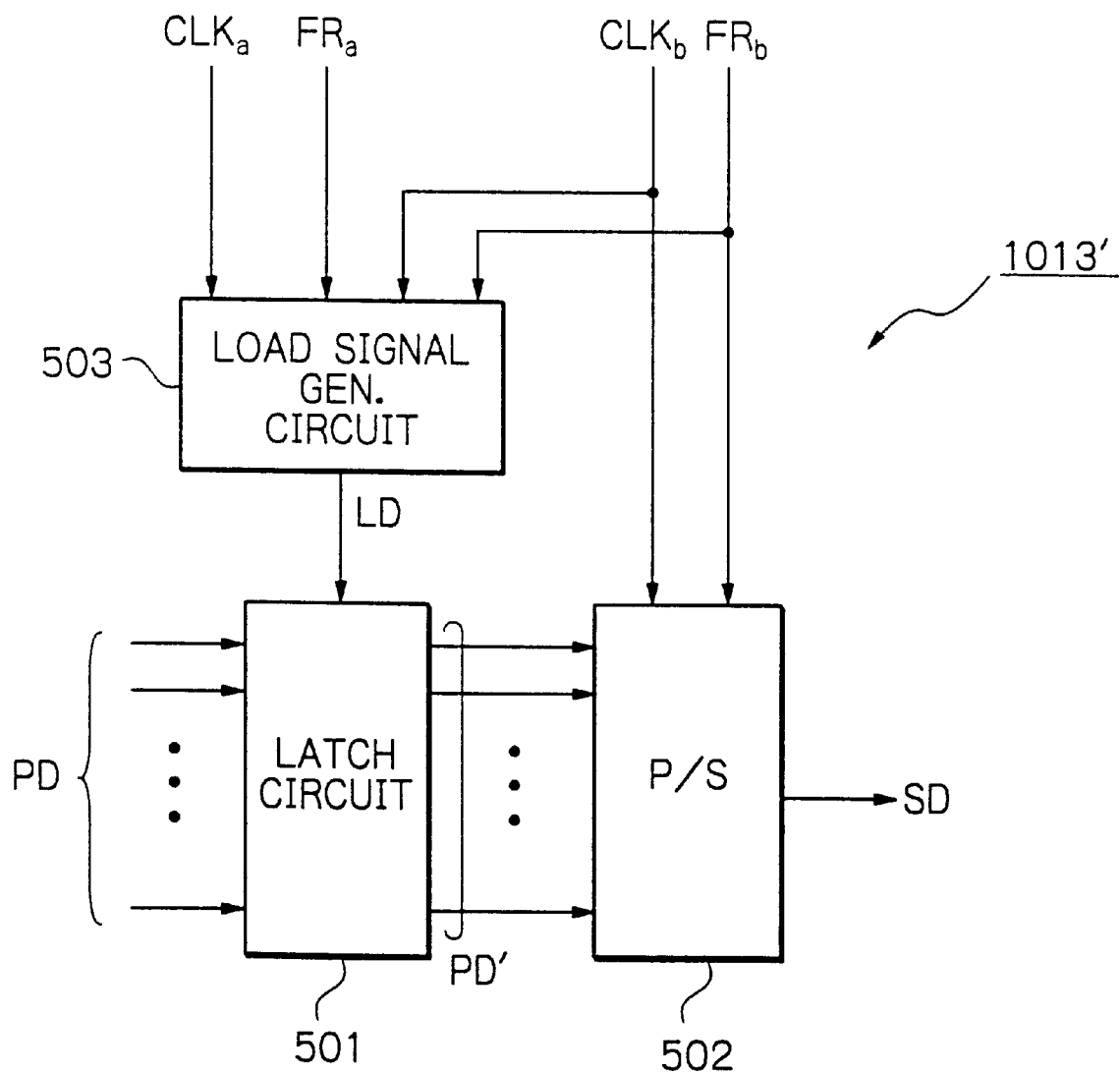
FIG. 5 is a detailed block circuit diagram of a first example of the data phase synchronization circuit of FIG. 3.

In FIG. 5, which is a detailed block circuit diagram of a first example of the data phase synchronization circuit 1013' of FIG. 3, the data phase synchronization circuit 1013' is constructed by a latch circuit 501 for latching the parallel data PD from the smoothing digital filter 1012' to generate parallel data PD', a parallel-to-serial (P/S) converter 502 for converting the parallel data PD' into the serial data SD, and a load signal generating circuit 503 for generating a load signal LD for the latch circuit 501.

The latch circuit 501 is driven in response to a rising edge of the load signal LD to latch the parallel data PD.

The parallel-to-serial converter 502 is formed by a shift register. Upon receipt of a rising edge of the frame signal $FR_b$, the shift register loads the parallel data PD' from the latch circuit 501. Then, upon receipt of a rising edge of the clock signal $CLK_b$, the shift register carries out a one-bit shift operation. Thus, the serial data SD is obtained in accordance with the clock signal $CLK_b$ and the frame signal $FR_b$.

The load signal generating circuit 503 detects rising edges of the frame signals $FR_a$ and $FR_b$ to generate the load signal LD at a timing where the rising edges of the frame signals $FR_a$ and $FR_b$ are not present, thus avoiding data punch through in the latch circuit 501 and the parallel-to-serial converter 502. Therefore, correct data transfer can be established through the latch circuit 501 and the parallel-to-serial converter 502, whatever the relationship between the frame signals $FR_a$ and $FR_b$ is.

Figure 6:
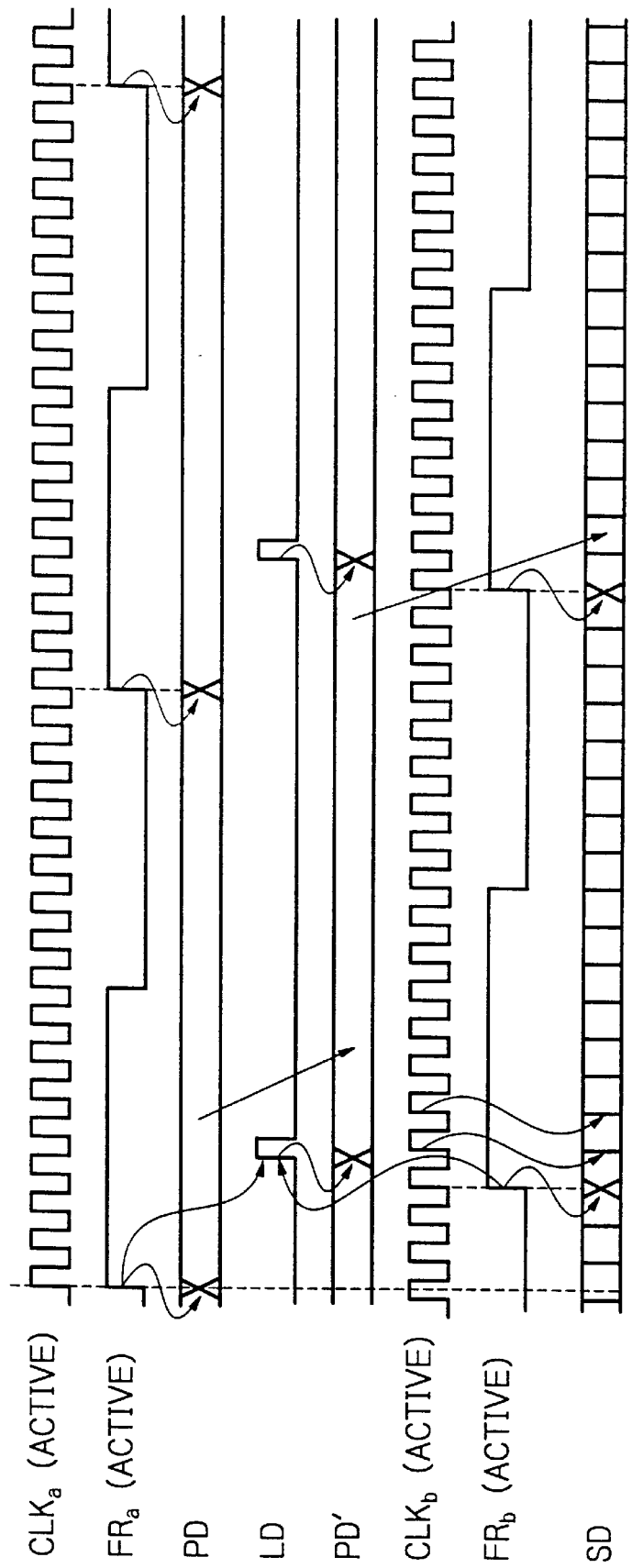
FIG. 6 is a timing diagram for explaining the operation of the data phase synchronization circuit of FIG. 5.

The operation of the data phase synchronization circuit 1013' of FIG. 5 is explained next with reference to FIG. 6.

The parallel data PD of the smoothing digital filter 1012' in response to the clock signal $CLK_a$ and the frame signal $FR_a$ is renewed at every rising edge of the frame signal $FR_a$.

Also, the load signal LD is generated at a timing different from the rising edges of the frame signals $FR_a$ and $FR_b$. As a result, the parallel data PD is latched in the latch circuit 501.

Further, the parallel data PD' latched in the latch circuit 501 is loaded in the parallel-to-serial converter 502 in response to the frame signal $FR_b$, and then, the parallel data loaded in the parallel-to-serial converter 502 is shifted in response to the clock signal $CLK_b$, thus generating the serial data SD.

Figure 7:
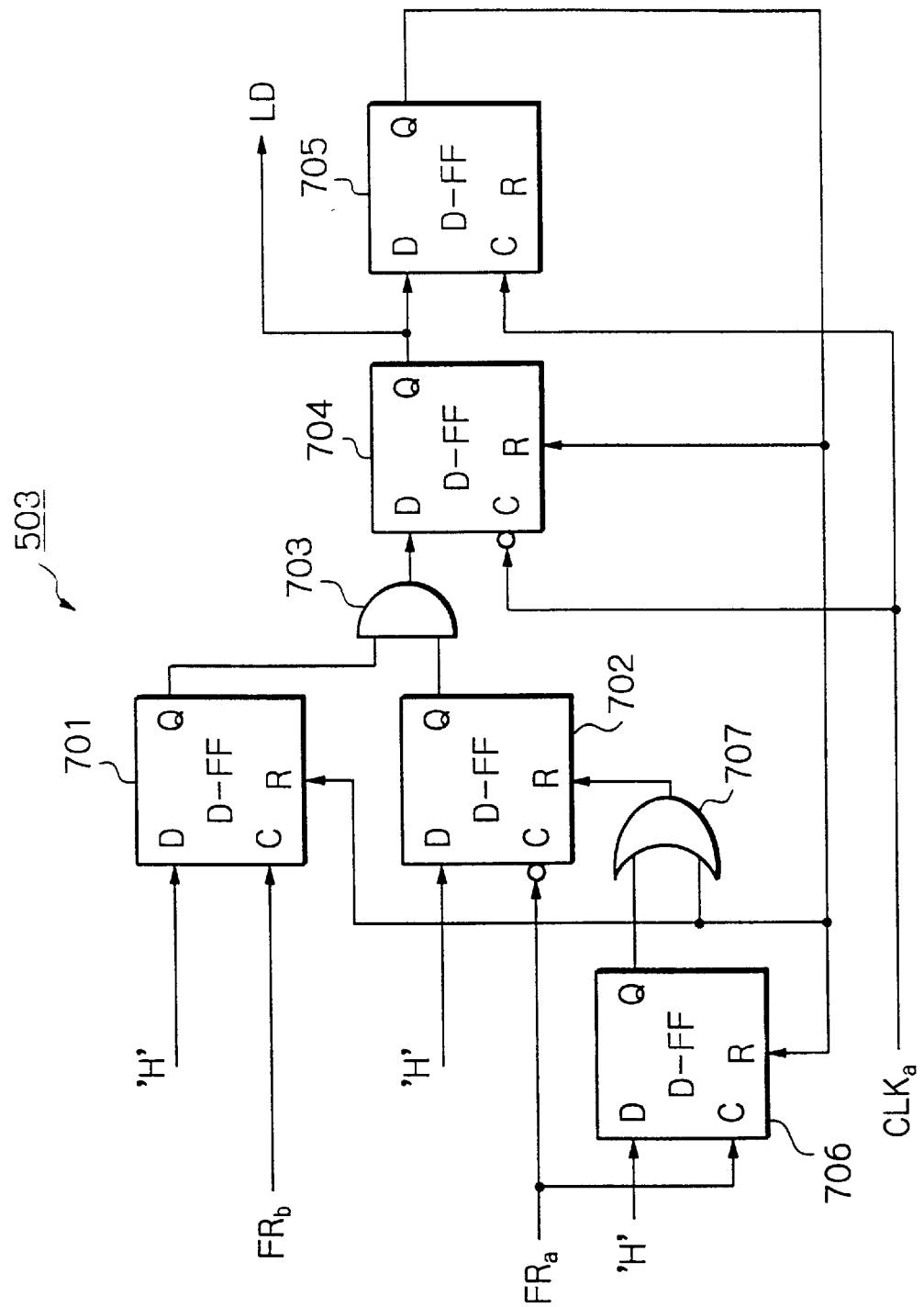
FIG. 7 is a detailed circuit diagram of the load signal generating circuit of FIG. 5.
Figure 8:
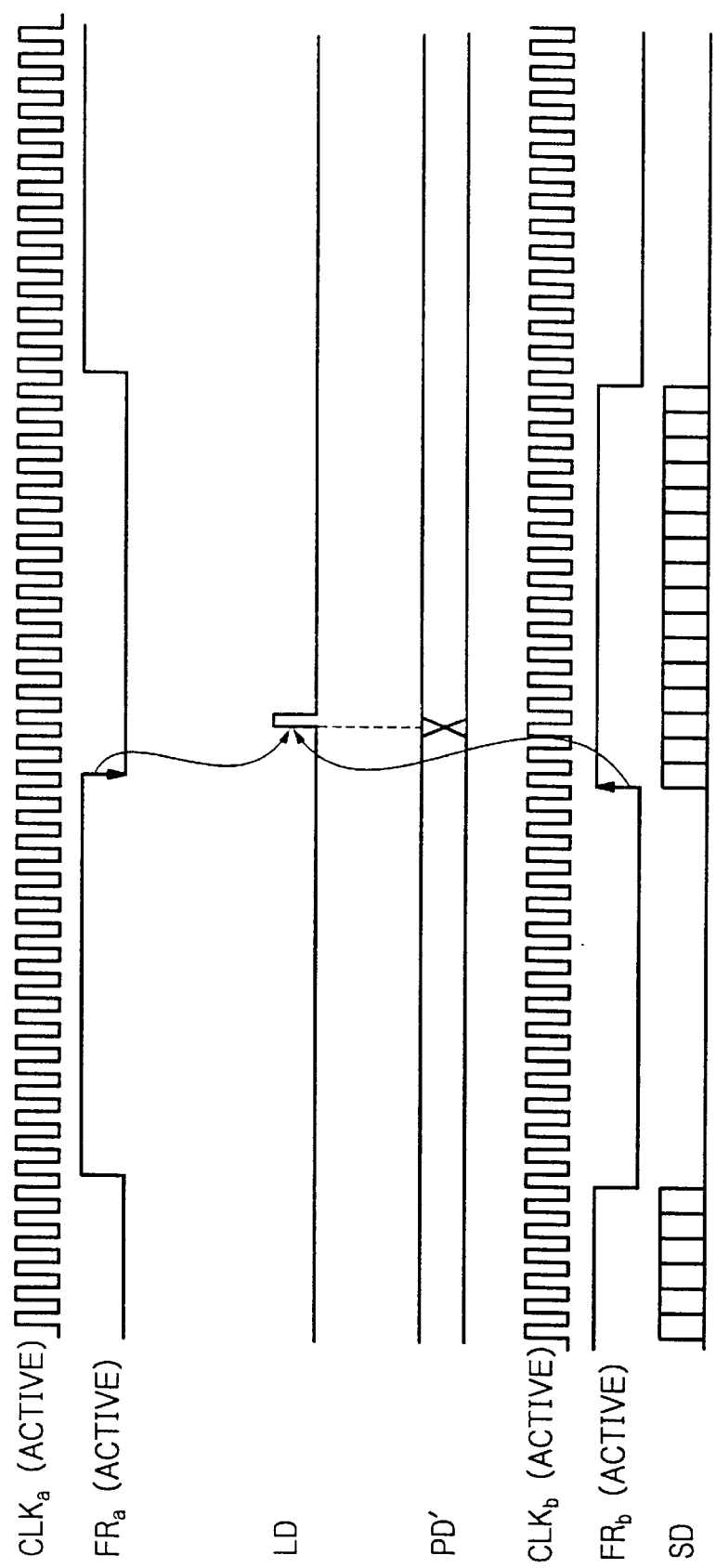
FIG. 8 is a timing diagram for explaining the operation of the load signal generating circuit of FIG. 7.

In FIG. 7, which is a detailed circuit diagram of the load signal generating circuit 503 of FIG. 5, the load signal generating circuit 503 is constructed by a D-type flip-flop 701 for detecting a rising edge of the frame signal $FR_b$, a D-type flip-flop 702 for detecting a falling edge of the frame signal $FR_a$, and an AND circuit 703 connected to the D-type flip-flops 701 and 702. Also, a D-type flip-flop 704 for detecting whether or not; both of the D-type flip-flops 701. and 702 generate high level signals is connected to the AND circuit 703. Therefore, only when both of the D-type flip-flops 701 and 702 generate high level signals, i.e., after a rising edge is detected in the frame signal $FR_b$ and a falling edge is detected in the frame signal $FR_a$, as shown in FIG. 8, does the D-type flip-flop 704 generate a load signal LD.

Also, the load signal generating circuit 503 includes D-type flip-flops 705 and 706 and an OR circuit 707 for resetting the D-type flip-flops 701, 702 and 704. That is, after the D-type flip-flop 704 generates the load signal LD, the D-type flip-flop 705 generates a reset signal to reset the flip-flops 701, 702 and 704 as well as the flip-flop 706. Also, when the D-type flip-flop 706 detects a rising edge in the frame signal $FR_a$, the D-type flip-flop 706 generates a reset signal to reset the D-type flip-flop 702.

In the above-described embodiment using the data phase synchronization circuit 1013' of FIG. 5, when the smoothing digital filter 1012' is constructed by a 64-tap decimation filter and a 32-tap rootraised cosine filter, the frequency of the clock signal $CLK_b$ is 3 MHz, and one data is comprised of 8 bits, then the waiting time period T1' is 20 μs, which is much smaller than the prior art waiting time period T1 such as 380 μs. In this case, if the intermittent time period T' (=T) is 40 ms, the average dissipation current can be reduced by 1.6 mA.

Figure 9:
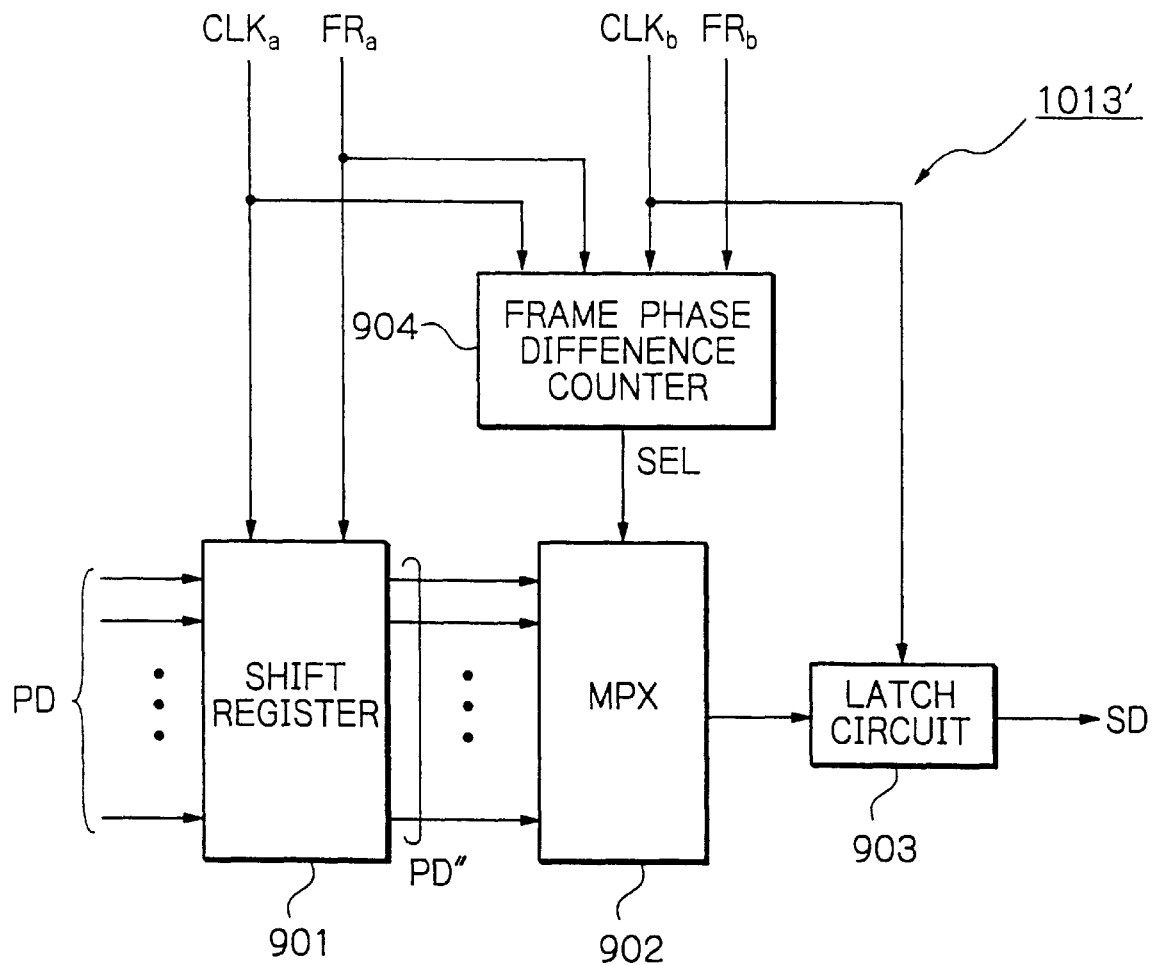
FIG. 9 is a detailed block circuit diagram of a second example of the data phase synchronization circuit of FIG. 3.

In FIG. 9, which illustrates a second example of the data phase synchronization circuit 1013' of FIG. 3, the data phase synchronization circuit 1013' is constructed by a shift register 901 for receiving the parallel data PD from the smoothing digital filter 1012' to generate parallel data PD", a multiplexer 902 for selecting one bit from the parallel data PD", a latch circuit 903 for receiving a selected bit from the multiplexer 902 to generate serial data SD, and a frame phase difference counter 904 for generating a selection signal SEL for operating the multiplexer 902.

Figure 10:
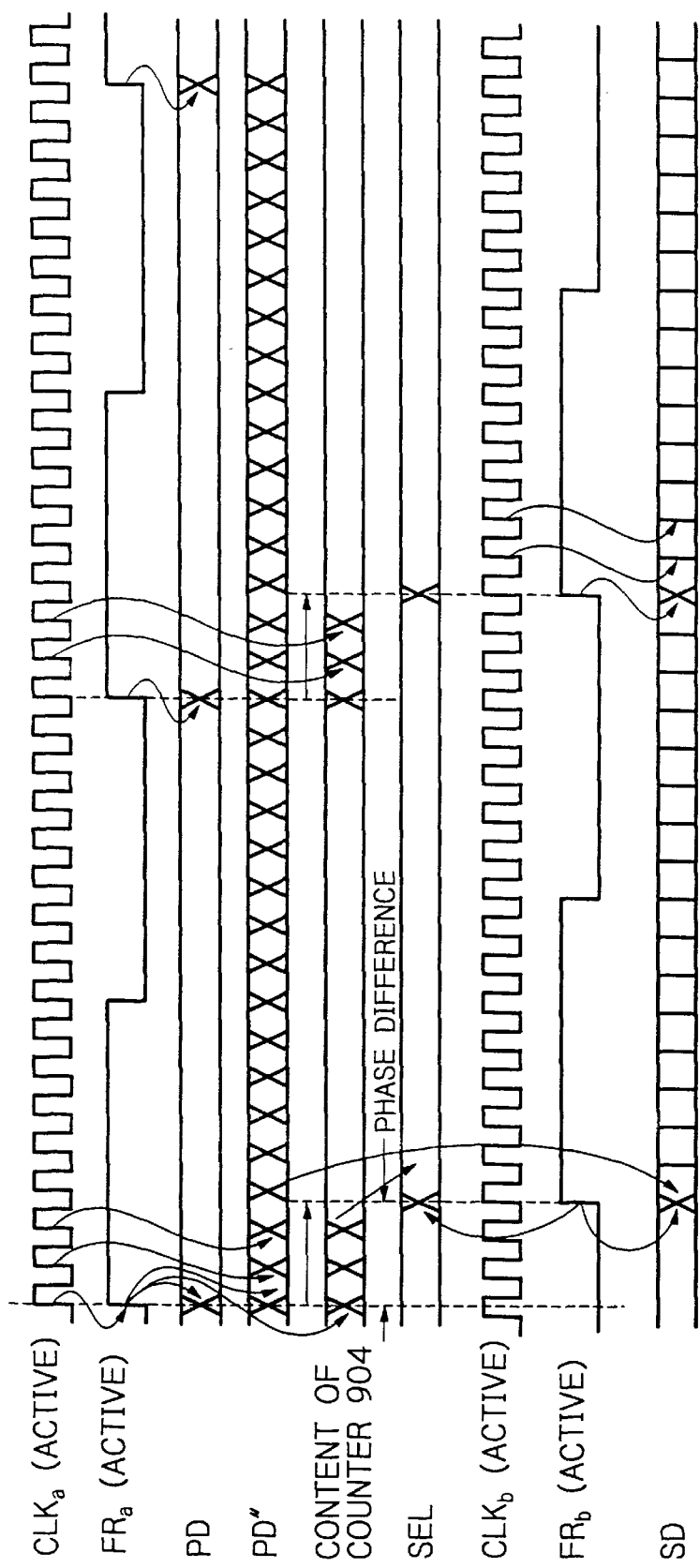
FIG. 10 is a timing diagram for explaining the operation of the data phase synchronization circuit of FIG. 9.

The operation of the data phase synchronization circuit 1013' of FIG. 9 is explained next with reference to FIG. 10.

Upon receipt of a rising edge of the frame signal $FR_a$, the shift register 901 loads the parallel data PD from the smoothing digital filter 1012'. Then, upon receipt of a rising edge of the clock signal CLKA, the shift register 901 performs a one-bit shift operation upon the content thereof. As a result, the parallel data PD' is generated from the shift register 901.

Upon receipt of a rising edge of the frame signal $FR_a$, the frame phase difference counter 904 is cleared and initiates counting the pulses of the clock signal $CLK_a$. On the other hand, upon receipt of a rising edge of the frame signal $FR_b$, the frame phase difference counter 904 stops its counting operation. In this state, the content of the frame phase difference counter 904 represents the difference in phase between the frame signals $FR_a$ and $FR_b$. Thus, the frame phase difference counter 904 generates a selection signal SEL showing the difference in phase between the frame signals $FR_a$ and $FR_b$.

The multiplexer 902 decodes the selection signal SEL to select one bit of the parallel data PD" in accordance with the difference in phase between the frame signals $FR_a$ and $FR_b$. Then, the latch circuit 903 latches the one bit of the parallel data PD" selected by the multiplexer 904 in accordance with the clock signal $CLK_b$.

Thus, the serial data SD is obtained in synchronization with the clock signal $CLK_b$.

In the above-described embodiment using the data phase synchronization circuit 1013' of FIG. 9, the serial data SD can be obtained earlier by one frame as compared with the embodiment using the data phase synchronization circuit 1013' of FIG. 5.

As explained hereinabove, according to the present invention, in an intermittent reception mode, even when the frame signal $CLK_b$ becomes in an OFF state or the phase relationship between the frame signals $CLK_a$ and $CLK_b$ fluctuates, since the smoothing digital filter is always operating, the serial data supplied to the digital baseband signal processing circuit can be promptly recovered, thus decreasing a waiting time period. As a result, the power dissipation can be decreased.

In addition, since the waiting time period can be decreased, the serviceability of the digital baseband signal processing circuit can be increased, so that the dissipation current of the radio frequency section can be decreased.

What is claimed is:

1. A digital demodulation apparatus comprising:
    a first signal generating circuit for generating a first clock signal and a first frame signal which are always in an active state;
    a second signal generating circuit for generating a second clock signal and a second frame signal which are intermittently in an active state;
    an analog-to-digital converter for converting an intermediate analog signal into a digital signal;
    a smoothing digital filter, connected to said first signal generating circuit and said analog-to-digital converter, for performing a smoothing operation upon said digital signal in synchronization with said first clock signal and said first frame signal to generate first parallel data;
    a data phase synchronization circuit, connected to said first and second signal generating circuits and said smoothing digital filter, for converting said first parallel data into serial data in synchronization with said second clock signal and said second frame signal; and a digital signal processing circuit, connected to said second signal generating circuit and said data phase synchronization circuit, for performing a signal processing operation upon said serial data in synchronization with said second clock signal and said second frame signal.

2. The apparatus as set forth in claim 1, further comprising:

an oscillator for generating a system clock signal; and a control circuit, said first signal generating circuit comprising a first frequency divider, connected to said oscillator, for dividing a frequency of said system clock signal, said first frequency divider being always operated by said control circuit, said second signal generating circuit comprising a second frequency divider, connected to said oscillator, for dividing a frequency of said system clock signal, said second frequency divider being intermittently operated by said control circuit.

3. The apparatus as set forth in claim 1, wherein said data phase synchronization circuit comprises:

a latch circuit, connected to said smoothing digital filter, for latching said first parallel data to generate second parallel data in synchronization with a load signal;

a parallel-to-serial converter, connected to said second signal generating circuit and said latch circuit, for loading said second parallel data in synchronization with said second frame signal and shifting said loaded second parallel data in synchronization with said second clock signal; and a load signal generating circuit, connected to said first and second signal generating circuits and said latch circuit, for generating said load signal in accordance with said first and second clock signals and said first and second frame signals.

4. The apparatus as set forth in claim 3, wherein said load signal generating circuit comprises:

a first detection circuit, connected to said second signal generating circuit, for detecting a rising edge of said second frame signal;

a second detection circuit, connected to said first signal generating circuit, for detecting a falling edge of said first frame signal; and a logic circuit, connected to said first and second detection circuits, for generating said load signal after said rising edge is detected in said second frame signal and said falling edge is detected in said first frame signal.

5. The apparatus as set forth in claim 1, wherein said data phase synchronization circuit comprises:

a shift register, connected to said first signal generating circuit and said smoothing digital filter, for loading said first parallel data in synchronization with said first frame signal and performing a one-bit shift operation upon a content of said shift register in synchronization with said first clock signal to generate second parallel data;

a multiplexer, connected to said shift register, for selecting one bit of said second parallel data in accordance with a selection signal;

a latch circuit, connected to said second signal generating circuit and said multiplexer, for latching said selected bit of said second parallel data in synchronization with said second clock signal to generate said serial data; and a frame phase difference counter, connected to said first and second signal generating circuits and said multiplexer, for calculating a difference in phase between said first and second frame signals to generate said selection signal showing said difference in phase.

6. The apparatus as set forth in claim 5, wherein said frame phase difference counter initiates counting pulses of said first clock signal in synchronization with a rising edge of said first frame signal and stops counting the pulses of said first clock signal in synchronization with a rising edge of said second frame signal.

7. The apparatus as set forth in claim 1, wherein said smoothing digital filter comprises a finite length impulse response type filter.

8. A digital demodulation apparatus comprising:

a first signal generating circuit for generating a first clock signal and a first frame signal which are always in an active state;

a second signal generating circuit for generating a second clock signal and a second frame signal which are intermittently in an active state;

an analog-to-digital converter for converting an intermediate analog signal into a digital signal;

a smoothing digital filter, connected to said first signal generating circuit and said analog-to-digital converter, for performing a smoothing operation upon said digital signal in synchronization with said first clock signal and said first frame signal to generate first parallel data;

a latch circuit, connected to said smoothing digital filter, for latching said first parallel data to generate second parallel data in synchronization with a load signal;

a parallel-to-serial converter, connected to said second signal generating circuit and said latch circuit, for loading said second parallel data in synchronization with said second frame signal and shifting said loaded second parallel data in synchronization with said second clock signal to generate serial data;

a load signal generating circuit, connected to said first and second signal generating circuits and said latch circuit, for generating said load signal in accordance with said first and second clock signals and said first and second frame signals; and a digital signal processing circuit, connected to said second signal generating circuit and said parallel-to-serial converter, for performing a signal processing operation upon said serial data in synchronization with said second clock signal and said second frame signal.

9. A digital demodulation apparatus comprising:

a first signal generating circuit for generating a first clock signal and a first frame signal which are always in an active state;

a second signal generating circuit for generating a second clock signal and a second frame signal which are intermittently in an active state;

an analog-to-digital converter for converting an intermediate analog signal into a digital signal;

a smoothing digital filter, connected to said first signal generating circuit and said analog-to-digital converter, for performing a smoothing operation upon said digital signal in synchronization with said first clock signal and said first frame signal to generate first parallel data;

a shift register, connected to said first signal generating circuit and said smoothing digital filter, for loading said first parallel data in synchronization with said first frame signal and performing a one-bit shift operation upon a content of said shift register in synchronization with said first clock signal to generate second parallel data;

a multiplexer, connected to said shift register, for selecting one bit of said second parallel data in accordance with a selection signal;

a latch circuit, connected to said second signal generating circuit and said multiplexer, for latching said selected bit of said second parallel data in synchronization with said second clock signal to generate serial data;

a frame phase difference counter, connected to said first and second signal generating circuits and said multiplexer, for calculating a difference in phase between said first and second frame signals to generate said selection signal showing said difference in phase; and a digital signal processing circuit, connected to said second signal generating circuit and said latch circuit, for performing a signal processing operation upon said serial data in synchronization with said second clock signal and said second frame signal.

* * * * *